US010877784B1

(12) United States Patent
Testuggine et al.

(10) Patent No.: US 10,877,784 B1
(45) Date of Patent: Dec. 29, 2020

(54) DETERMINING AND SERVICING USER INTENT WITH A VIRTUAL ASSISTANT

(71) Applicant: Facebook, Inc., Menlo Park, CA (US)

(72) Inventors: Davide Testuggine, Redwood City, CA (US); Wenhai Yang, Mountain View, CA (US); Vivek Natarajan, Palo Alto, CA (US); Brett Charles Groel, Redwood City, CA (US); Julia Framel, San Francisco, CA (US); Laurent Nicolas Landowski, Emerald Hills, CA (US); Brian Nelson, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 200 days.

(21) Appl. No.: 15/993,510

(22) Filed: May 30, 2018

(51) Int. Cl.
*G06F 15/16* (2006.01)
*G06F 9/451* (2018.01)
*H04L 12/58* (2006.01)
*G06Q 50/00* (2012.01)

(52) U.S. Cl.
CPC ............. *G06F 9/453* (2018.02); *G06Q 50/01* (2013.01); *H04L 51/32* (2013.01)

(58) Field of Classification Search
CPC .......... G06F 9/453; G06Q 50/01; H04L 51/32
USPC ....................................................... 709/206
See application file for complete search history.

(56) References Cited

U.S. PATENT DOCUMENTS

| | | | | |
|---|---|---|---|---|
| 7,685,199 | B2* | 3/2010 | Chandrasekar | G06F 16/3334 707/748 |
| 7,814,055 | B2* | 10/2010 | Hullot | G06F 16/273 707/628 |
| 8,037,021 | B2* | 10/2011 | Adler | G06Q 10/109 707/610 |
| 8,126,903 | B2* | 2/2012 | Lehmann | G06Q 50/30 707/758 |
| 8,954,092 | B2* | 2/2015 | Kirmse | G06F 16/9537 455/456.3 |
| 9,058,595 | B2* | 6/2015 | Coffman | G06Q 10/109 |
| 9,245,010 | B1* | 1/2016 | Donneau-Golencer | G06F 16/245 |
| 9,298,818 | B1* | 3/2016 | Donneau-Golencer | G06F 16/68 |
| 9,443,007 | B2* | 9/2016 | Donneau-Golencer | G06F 16/337 |
| 9,460,608 | B2* | 10/2016 | Dave | G06Q 10/1097 |
| 9,529,864 | B2* | 12/2016 | Sundelin | G06F 16/24575 |
| 9,774,823 | B1* | 9/2017 | Gadnir | H04N 5/23296 |
| 9,959,037 | B2* | 5/2018 | Chaudhri | H04L 51/22 |
| 10,013,489 | B2* | 7/2018 | Jones | G06F 16/951 |
| 10,097,973 | B2* | 10/2018 | Gross | H04W 4/025 |
| 10,135,937 | B2* | 11/2018 | Dotan-Cohen | H04L 67/26 |
| 10,191,903 | B2* | 1/2019 | Lewis | G06F 40/45 |
| 10,200,824 | B2* | 2/2019 | Gross | H04W 4/40 |
| 10,223,673 | B2* | 3/2019 | Avalos Vega | G06Q 10/1095 |

(Continued)

*Primary Examiner* — Alicia Baturay

(74) *Attorney, Agent, or Firm* — Fenwick & West LLP

(57) ABSTRACT

A virtual assistant receives a message including message content from a client device. The virtual assistant determines an intent to organize an event and initial parameters for the event based on the message content. The virtual assistant retrieves a set of messages related to the received message from a data store and refines the initial parameters based on the related messages. A set of potential recommendations is generated based on the refined event parameters and the virtual assistant selects one or more of the potential recommendations to surface to users. The selected recommendations are sent to the client device for presentation to the user.

23 Claims, 6 Drawing Sheets

(56) References Cited

U.S. PATENT DOCUMENTS

| | | | |
|---|---|---|---|
| 10,313,357 B2* | 6/2019 | Roussos | G06F 21/31 |
| 10,475,000 B2* | 11/2019 | Sarrazin | G06Q 10/109 |
| 10,565,219 B2* | 2/2020 | Gross | H04L 51/22 |
| 2009/0132632 A1* | 5/2009 | Jackson | H04L 51/34 |
| | | | 709/201 |
| 2009/0281843 A1* | 11/2009 | Coffman | G06Q 10/1093 |
| | | | 705/5 |
| 2009/0282342 A1* | 11/2009 | Fabris | G06Q 10/02 |
| | | | 715/733 |
| 2014/0035949 A1* | 2/2014 | Singh | G06Q 10/109 |
| | | | 345/629 |
| 2016/0086116 A1* | 3/2016 | Rao | G06F 3/0481 |
| | | | 705/7.21 |
| 2016/0253630 A1* | 9/2016 | Oliveri | G06Q 10/1095 |
| | | | 705/7.19 |
| 2019/0102464 A1* | 4/2019 | Goenka | H04L 51/063 |
| 2019/0188059 A1* | 6/2019 | Krishna | G06F 9/451 |
| 2019/0205839 A1* | 7/2019 | Dotan-Cohen | G06Q 10/1093 |

* cited by examiner

DETERMINING AND SERVICING USER INTENT WITH A VIRTUAL ASSISTANT

BACKGROUND

This disclosure relates generally to virtual assistants, and in particular to scheduling events with the aid of a virtual assistant.

As the availability of computing power has gone up, while the size of computing devices and associated costs have gone down, the range of uses for computing devices has increased. One area of recent growth has been virtual assistants, which are now available on many smartphones as well as through stand-alone devices. Virtual assistants interact with users to assist them in completing various tasks efficiently. As more and more people gain access to virtual assistants, the demand for new and improved functionality is increasing.

One task with which a virtual assistant can provide aid is organizing events. When a user is organizing an event, there is a lot of information available through the internet that may be helpful. However, to identify and access such information requires the user to make multiple requests and the results of those requests may be presented separately. Thus, the process may be inefficient and frustrating for the user.

SUMMARY

In various embodiments, a virtual assistant provides an efficient user interface to assist users in organizing events. The virtual assistant interfaces with a messenger application or other messaging service through which the users communicate. As the users converse about the event with each other, the virtual assistant develops an understanding of the user's preferences for the event. Based on its understanding of the user's preferences, the virtual assistant generates recommendations for the event (e.g., who should be included, what activities should be involved, where the event should take place, and when the event should take place). At some point, the virtual assistant surfaces one or more recommendations for presentation to the users. The users can select one of the recommendations (e.g., by voting) to implement as the event. Thus, the process is mostly transparent to the users until the recommendations are surfaced. This increases the efficiency of the interface between the users and the virtual assistant as the users only actively interact with it once the recommendations are sufficiently well developed to provide value. Alternatively, the developing recommendations may be provided in a dedicated portion of a user interface such that the users can interact with the recommendations (e.g., by providing feedback) or ignore them until they become further developed.

In one embodiment, the virtual assistant receives a message including message content from a client device. The virtual assistant determines an intent to organize an event and initial parameters for the event based on the message content. The virtual assistant retrieves a set of messages related to the received message from a data store and refines the initial parameters based on the related messages. A set of potential recommendations is generated based on the refined event parameters and the virtual assistant selects one or more of the potential recommendations to surface to users. The selected recommendations are sent to the client device for presentation to the user.

Figure 1:
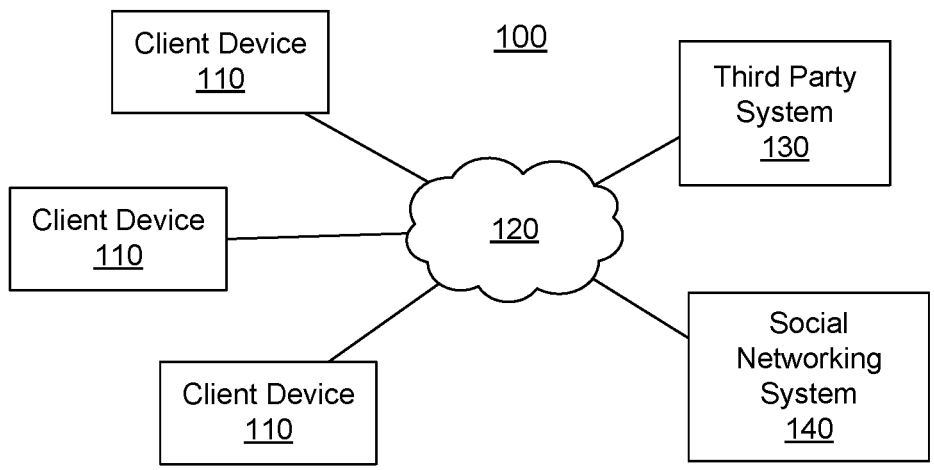
FIG. 1 is a block diagram of a system environment in which a virtual assistant operates, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A virtual assistant uses information extracted from a set of related messages exchanged between a group of users to assist those users in organizing an event. The messages may include text, audio, images, video, and/or other types of content. For convenience, the set of related messages is referred to herein as a thread, although in some instances, the messages may not be stored as a single contiguous list of chronologically ordered messages. For example, the virtual assistant may infer additional context for a current discussion between a group of users based on earlier discussions between some or all of the users in the group.

In one embodiment, the virtual assistant analyzes a thread to identify possible values for four fields: who, what, where, and when. Based on the possible values, the virtual assistant identifies potential recommendations for the event and applies a machine-learned model to rank the potential recommendations. When the thread is relatively short, there may be a massive number of potential recommendation for which the model may not be able to meaningfully determine which are "better" or "worse." For example, after a couple of messages have been exchanged, the possible values might be: who—any two users in the group; what—get dinner; where—San Francisco; and when—anytime tonight. This might generate thousands (or even millions) of potential recommendations. Thus, the virtual assistant may not present any recommendations to the users at this point.

As the thread develops, with more messages being added by users in the group, the virtual assistant refines the possible values for the fields. As the possible values are refined, the potential recommendations are also updated. At some point, the output from the model includes a subset of manageable size (e.g., approximately five recommendations) that can be meaningfully distinguished from other potential recommendations. To return to the previous example, additional messages between the group may indicate that three people are definitely planning on attending, they want to eat pizza, and none of them want to travel more than five miles from their current locations. Combined with information available from other sources (e.g., opening times, customer reviews, etc.) and preferences of the three users (e.g., one of them has previously liked the social network page of a local pizza restaurant), this may enable the model to generate a manageable list of places and times for the group to meet for dinner.

The list of recommendations is presented to the users at their client devices. The client devices may provide a user interface that enables the users to vote or otherwise indicate their preferences from among the options included in the list. If the group selects one of the options (e.g., by majority or unanimous vote), the virtual assistant creates an event (e.g., by adding it to the users' calendar data) based on the selected option. The users' client devices 110 may then provide reminders, directions to the location of the physical event, relevant suggestions (e.g., what menu items are popular in the case of a meal-based event), pertinent promotional offers, and the like. Conversely, if the group of users does not reach a consensus on a particular option, conversation in the thread may continue and the virtual assistant may later provide an updated list of recommendations.

System Architecture to client devices for use by an application executing on the client device. In other embodiments, a third party system 130 provides content or other information for presentation via a client device 110. A third party system 130 may also communicate information to the online system 140, such as advertisements, content, or information about an application provided by the third party system 130.

The online system 140 includes a virtual assistant 230 that provides assistance to a user with performing tasks. The functionality provided by the virtual assistant 230 includes aiding in the scheduling and planning of events. The virtual assistant 230 may leverage information explicitly included in a message thread as well as other data available in the online system 140 (e.g., social data indicating the opinions of other users regarding potential activities and venues, information about the user's tastes and interests, etc.) to recommend events the user. This may enable the virtual assistant 230 to quickly schedule and plan events that meet the requirements and preferences of participants without prompting the user to provide a large amount of information or direction. Thus, the virtual assistant 230 may provide an efficient interface between the user and a client device 110.

Figure 2:
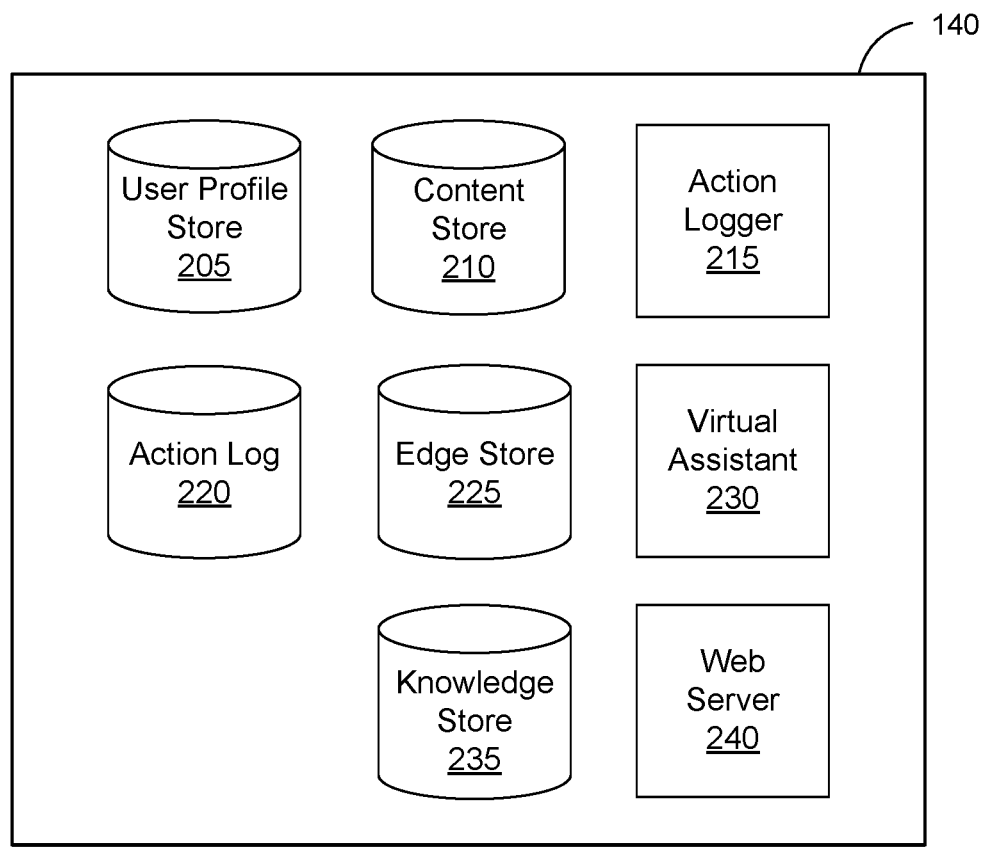
FIG. 2 is a block diagram of the online system shown in FIG. 1, in accordance with an embodiment.

FIG. 2 is a block diagram of an architecture of the online system 140, according to an embodiment. The online system 140 shown in FIG. 2 includes a user profile store 205, a content store 210, an action logger 215, an action log 220, an edge store 225, a virtual assistant 230, a knowledge store 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

In one embodiment, the user profile store 205 also stores calendar data for the user. The calendar data includes events that the user previously participated in as well as future events in which the user has expressed interest. For a given event, the calendar data includes information about the event such as date and time, participants, location, and activity (or activities) involved. The location may be specified as a specific geographic position (e.g., a set of GPS coordinates) and/or as a venue. The term venue in this context refers to a business, building, park, or other identifiable named location. The activity may be specified from a predetermined list of possible activities and/or stored as free text. The calendar data may also include other types of entry, such as appointments, periods where the user is (or is expected to be) at work, vacations, and the like.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system, as well as actions on third party systems 130 that communicate information to the online system. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that may be included in the action log 220 include: commenting on a photo album, communicating with a user, establishing a connection with an object,joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system. For example, an e-commerce website may recognize a user of an online system 140 through a social plug-in enabling the e-commerce website to identify the user of the online system. Because users of the online system 140 are uniquely identifiable, e-commerce websites, such as in the preceding example, may communicate information about a user's actions outside of the online system to the online system for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system based on the actions performed by the user. A user's affinity may be computed by the online system 140 over time to approximate the user's interest in an object, in a topic, or in another user in the online system based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The virtual assistant 230 interacts with users via their client devices 110 to provide assistance with tasks. One such task is assisting a group of users to organize an event. In one embodiment, the virtual assistant 230 interacts with the users via a messaging system. The virtual assistant 230 may appear as a separate contact of the users within the messaging system that can be included in a discussion thread in which an event is being organized. Alternatively, the virtual assistant 230 may be a plugin or feature of the messaging system that users can activate to provide assistance in any discussion thread which may relate to organizing an event. This may allow for a smoother user experience as the virtual assistant 230 need not be explicitly added to every discussion thread in which an event is being organized. In other embodiments, the virtual assistant 230 may interact with the users in other ways.

The virtual assistant 230 analyzes messages to identify an intent to organize an event and corresponding requirements for the event (e.g., limitations on who, what, where, and when). The virtual assistant 230 applies a machine-learned model to generate recommendations for the event. If the generated recommendations meet a set of criteria (e.g., less than a threshold number, one or more recommendations that exceed a threshold probability that they will meet the requirements, etc.), one or more recommendations are presented to the group of users at their client devices 110. The users select one of the recommendations (e.g., via majority of unanimous vote) and the virtual assistant 230 creates an event based on the selected recommendation. Various embodiments of the virtual assistant 230 are described in greater detail, with reference to FIG. 3.

The knowledge store 235 stores information that is known or assumed to be factual, according to one embodiment. The information in the knowledge store 235 may thus be treated as ground truth data. The virtual assistant 230 may use this information in generating event recommendations that meet the requirements and preferences of a group of users. In contrast to the edge store 225, which stores information about connections users and other objects that can be used as a proxy for real world connections, the knowledge store 235 stores information established from outside of the online system 140. For example, if the virtual assistant 230 determines that a group of users is planning on watching a movie and that a sci-fi movie would be a good match for the preferences of the group, the virtual assistant might retrieve a list of sci-fi movies based on genre information in the knowledge store 235.

In one embodiment, the knowledge store 235 includes a knowledge graph of information about entities that might be included in event recommendations (e.g., movies, concerts, restaurants, venues, parks, etc.). The knowledge graph includes a node for each entity that includes an identifier of the entity (e.g., a title, unique identifying number, etc.). The nodes may be split into domains of different types of the corresponding entities (e.g., a movies domain, a restaurants domain, etc.) enabling easy filtering to identify entities of a type that are relevant to an event being planned. The node for an entity is linked to child nodes that store different information about the entity. For example, in the case of a movie, the child nodes might include: genre, cast, crew, a summary of the plot, and the like. The child nodes may store the information itself or pointers/links to where the information is located in the system environment 100. The knowledge graph may be indexed to enable queries to identify entities that meet specified criteria (e.g., a query to identify movies in a specified genre).

The web server 240 links the online system 140 via the network 120 to the one or more client devices 110, as well as to the one or more third party systems 130. The web server 240 serves web pages, as well as other content, such as JAVA®, FLASH®, XML, and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Example Virtual Assistant

Figure 3:
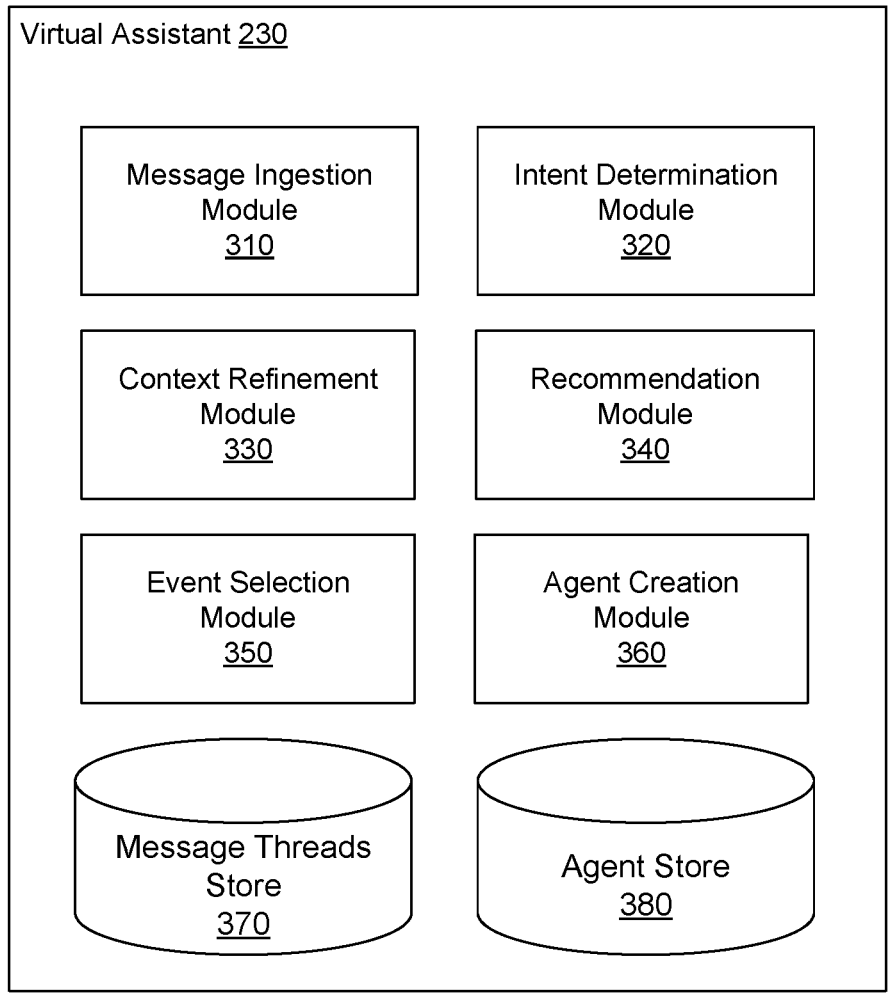
FIG. 3 is a block diagram of the virtual assistant shown in FIG. 2, in accordance with an embodiment.

FIG. 3 shows one embodiment of the virtual assistant 230. In the embodiment shown, the virtual assistant 230 includes a message ingestion module 310, an intent determination module 320, a context refinement module 330, a recommendation module 340, an event selection module 350, an agent creation module 360, a message threads store 370, and an agent store 380. In other embodiments, the virtual assistant 230 contains different and/or additional elements. In addition, the functions may be distributed among the elements in a different manner than described.

The message ingestion module 410 receives messages from client device 110 of users. In one embodiment, a user may create a message by entering text or with verbal utterances. If the user enters text, the message may be a copy of the text entered by the user. If the user makes a verbal utterance, the message may include an audio recording of the utterance. The message ingestion module 410 converts the audio recording to text with a speech-to-text algorithm. Alternatively, the recording may be converted to text by the client device 110 before it is sent to the virtual assistant 240.

The message ingestion module 310 processes messages received from client devices 110. A message may include content and metadata. In one embodiment, a user creates the message content at a client device 110 by entering text or with verbal utterances. If the user enters text, the message content may be a copy of the text entered by the user. If the user makes a verbal utterance, the message content may include an audio recording of the utterance. The message ingestion module 310 converts the audio recording to text with a speech-to-text algorithm. Alternatively, the recording may be converted to text by the client device 110 before it is sent to the virtual assistant 230.

The metadata indicates whether the message is part of an existing thread (e.g., stored in the message threads store 370). In one embodiment, the metadata includes a thread identifier, such as a unique thread ID number. On receiving a message, the message ingestion module 310 searches the message threads store 370 to determine whether it already includes one or more messages with the same thread identifier (i.e., messages in the same thread). If so, the received message is stored in association with the other messages in the thread. If not, the message ingestion module 310 stores the message and the thread identifier as a new thread. Alternatively, the metadata for the received message may include a message identifier (e.g., a message ID number) for another message to which it is a reply (referred to as the "parent message"). In which case, the message ingestion module 310 may store the received message in conjunction with the message identifier of the parent message or search the message threads store 370 for the message identifier and store the received message in conjunction with a pointer to the parent message. Thus, a thread may be stored as a series of messages and pointers to the preceding message in the thread. In other embodiments, different ways of storing the relationships between messages in a thread may be used.

The intent determination module 320 analyzes a received message in a thread to determine if the sending user's intent is to organize an event. In various embodiments, an event being planned is represented by an event data object that stores information regarding user preferences and requirements for the event. In response to receiving the message, the intent determination module 320 checks whether the thread is already associated with an event data object (e.g., one is already stored in the message threads store 370 in conjunction with the thread identifier). If not, the intent determination module 320 creates a new event data object and associates if with the thread (e.g., by storing it in the message threads store 370 in conjunction with the thread identifier). A message that causes the creation of a new event data object is referred to herein as the initial message. This should not be taken to mean that the message is necessarily the first message in a thread, rather that it is the message that triggered creation of a specific event data object. For example, in a group chat between a group of users, there may be a long period (e.g., days, months, or even years) of general chat before the initial message triggers creation of an event data object.

In one embodiment, if a thread is already associated with an existing event data object, the intent determination module 320 may perform further analysis to determine whether the received message should be used to refine the existing event data object (as described below with reference to the context refinement module 330) or whether a new event data object should be created. The intent determination module 320 may create a new event data object if more than a certain amount of time has passed since the creation of the existing event data object (e.g., twenty-four hours, one week, etc.), a time period for the event represented by the existing event data object occurring has passed, the information included in the received message is irreconcilably inconsistent with the existing event data object (e.g., the existing event data object corresponds to arranging to see a movie on one day and the new message reads "anyone want to grab lunch tomorrow?"), and the like.

The intent determination module 320 may use a combination of rules and a machine-learned model to determine when an existing event data object should be replaced with a new one. For example, rules might provide coarse filtering for specific scenarios (e.g., if the when field of the existing event data object indicates that the event is in the past, then a new event data object should be created) with the model applying a broader but less specific analysis. Input signals for the model may include: time-based features (e.g., how far in the past/future is the event? How long since the last reply in the thread? How long since the last mention of the event? Etc.), space-based features (e.g., how far away is the event from the users' current locations?), and linguistic features (e.g., a similarity between what the user's are discussing in the most recent messages in the thread and the activities already in the what field of the event data object).

Alternatively, in another embodiment, a message thread may be associated with multiple event data objects. On receiving a new message, the intent determination module 320 analyzes the message to determine which event data object it should be applied to (or if a new event data object should be created). Thus, users can organize more than one event in the same message thread and the system does not forget information that has already been provided about one event based on the users starting to organize another event in parallel. For example, a group of friends may be planning a summer vacation together over a period of several months. During that time, they may also organize several nights out together in the same message thread. By analyzing the messages added to the thread, the intent determination module 320 may determine which messages relate to a night out and which messages relate to the summer vacation (e.g., based on what locations and activities are referenced in the message).

In one embodiment, an event data object includes four fields defining the event: who, what, where, and when. Each field identifies possible parameters for the event of the appropriate type (people for who, activities for what, locations for where, and times for when). The fields can identify ranges of parameters to consider (e.g., people who may be included, activities to consider, possible locations, and possible times). The fields may also place positive and negative limitations on parameters (e.g., people who must be included, times that are not suitable, etc.). Parameters may also be associated with a preference level indicating the desirability of selecting a particular parameter for the event. For example, if a message reads "I'd prefer to meet at 7 pm but could do 8 pm as well" then the when field might include 7 pm with a high level of desirability and 8 pm with a lower level of desirability. The desirability level may be expressed as a numerical score or as one of a predetermined number of levels (e.g., high, medium, low).

The who field includes identifiers (e.g., user IDs) for people who may participate in the event. When a new event data object is created, the who field may initially include the user who sent the initial message, any users who are explicitly identified in the initial message, any users who are participants in the message thread, or any other suitable set of users determined based on the initial message. In some embodiments, the intent determination module 320 may supplement the users included in the who field with additional users based on those already included. For example, if two users in the thread regularly participate in events with a third user, the third user might be recommended to the other two users for inclusion in the who field, even if the third user is not currently included or referenced in the thread.

The what field includes information about the activity (or activities) that may be included in the event. The activities included in the what field can be selected from a list of predefined activities. Alternatively or additionally, an activity may be stored as free text. For example, if semantic analysis of a message determines that a word or phrase is an activity, it may be added to the what field as a potential activity. When a new event data object is created, the what field may initially include any activity or activities explicitly referenced in the initial message. If there are no activities referenced in the initial message, the field may initially be empty. In some embodiments, the intent determination module 320 may supplement the activities included in the what field with additional activities based on the preferences of the users identified in the who field. For example, if a group of users in a thread regularly watch movies together, "watch a movie" might initially be included in the what field even if the message does not reference movies.

The where field includes information about possible locations for the event. Locations may be broad (e.g., a specific city or state) or narrow (e.g., a specific venue). The locations may be identified by geographic position data (e.g., GPS data) and/or a location identifier (e.g., a name, a venue ID number, a social network page in the online system 140, or the like). In some instances, locations may also be virtual (e.g., a link to an online chatroom, etc.). When a new event data object is created, the where field may initially include any location or locations explicitly referenced in the initial message. If there are no locations referenced in the initial message, the field may initially be empty. In some embodiments, the intent determination module 320 may supplement the locations included in the where field with additional locations based on the preferences of the users identified in the who field. For example, if a group of users in a thread regularly watch movies at a particular movie theater, it might initially be included in the where field even if the message does not explicitly identify any location. As another example, if a majority of the users in the thread are located in the same geographic area (e.g., San Francisco), the where field may initially include that geographic area.

The when field includes information about possible times for the event. The possible times may be broad ranges (e.g., next week, tomorrow, tonight, etc.) and/or specific start times. When a new event data object is created, the when field may initially include any time or times explicitly referenced in the initial message. If there are no times referenced in the initial message, the field may initially be empty. In some embodiments, the intent determination module 320 may supplement the times included in the when field with additional times based on the preferences of the users identified in the who field. For example, if a group of users in a thread regularly meet on Friday evenings, the when field might include the next Friday evening even if the message does not explicitly identify any time.

Regardless of the specific processes used for populating fields, in various embodiments, the intent determination module 320 outputs an event data object in response to determining that the intent of a received message (an initial message) is to create an event. The event data object includes who, what, where, and when fields. The fields are initially populated based on the initial message. Parameters included in the fields may be associated with preference levels indicating the desirability of selecting that parameter for the event. Some of the fields may initially be empty. The content of the fields determined from the initial message may be referred to as the initial event parameters.

The context refinement module 330 refines the initial event parameters using messages related to the initial message (related messages). In one embodiment, the context refinement module 330 retrieves other messages in the same thread as the initial message (e.g., from the message threads store 370). The retrieved messages may be all other messages in thread, all messages within a predefined time period (e.g., the last hour, day, or the like), all messages since the last chronological break in thread (e.g., a period of more than one hour with no messages being added to the tread, etc.), or some other set of messages from the thread. Additionally or alternatively, the context refinement module may retrieve additional messages related to the additional message, such as messages between the same group of users as the current thread but in a different thread, messages between at least two of the users in the current thread in a different thread that involved organizing an event (e.g., that is also associated with an event data object), or the like. The related messages may also include messages received after the initial message. For example, the context refinement module 330 may operate iteratively, identifying related messages as they are received (e.g., based on a thread ID or an ID of a message indicating it is a reply to a known related message, etc.).

Regardless of how the related messages are identified, the context refinement module 330 analyzes the related messages to refine the content of the fields of the event data object. In one embodiment, the context refinement module 330 may expand or restrict the parameters assigned to a field based on analysis of a message. With regard to expanding the parameters for a field, if the message references a possible parameter for one of the fields that is not already included in that field, it may be added to that field. For example, if the initial message proposed a time of 6 pm and a response reads "how about 7 pm?" then 7 pm might be added to the when field as a possible time. If the message includes a reference to a more specific parameter than one that is already stored in the field (e.g., a specific time within a range, a specific movie in a genre, a specific location in a city, etc.), the context refinement module 330 may add the more specific parameter to the field separately or narrow the scope of the parameter by replacing the currently stored more general parameter. For example, if the what field includes "watch a sci-fi movie" and the message suggests a specific sci-fi movie, the specific movie might be added. This retains the more general contextual information that the users want to watch a sci-fi movie and includes the specific example as an option. In contrast, if the when field includes "today" and the message states "I'm free after 6 pm" then "today" might be replaced with "6 pm to midnight."

In embodiments where parameters have preference levels, a reference in the message to a parameter that is already stored in a field may increase the preference level associated with that parameter. The preference level of a more general parameter may also be adjusted based on a reference to a corresponding specific parameter. For example, if a specific sci-fi movie is referenced in a message, the preference level for watching a sci-fi movie (any sci-fi movie) may be increased as well as the preference level for the specific movie.

With regard to restricting parameters for a field, if the message includes a negative reference to a parameter, that parameter may be removed from the field or an associated preference level reduced. In various embodiments, the context refinement module 330 performs a semantic analysis on the message to identify negative references to parameters. The negative references may be explicit (e.g., "I can't do 8 pm") or implicit (e.g., "I prefer 7 pm," which suggests other times are less preferable). The context refinement module 330 may remove or reduce the associated preference level of those parameters for which it identifies a negative reference.

The context refinement module 330 may additionally or alternatively add a negative parameter to the field indicating that the specified parameter should not be selected for the event. For example, if a message includes "I can't do 8 pm" a negative parameter indicating 8 pm should not be selected for the event may be added to the when field. In one embodiment, an explicit negative reference to a parameter may reduce the preference level for the parameter more than an implicit negative reference. For example, "I can't do 8 pm" is a strong indication that 8 pm is not a viable time for the event if the user who made the statement is to attend, whereas "I prefer 7 pm" suggests that, while 8 pm should be avoided if possible, it is still a viable option for that user. In some embodiments, the context refinement module 330 may learn a user's preferences over time. The context refinement module 330 may maintain counts of the number of times the user expresses preferences for specific times or some other metric indicating the user's preference for events at those times. Thus, for example, if the user regularly says "I prefer 7 pm" when organizing an event of a specific type (e.g., eating at a restaurant), the context refinement module 330 may automatically increase the preference level for 7 pm even if the user has made no reference to time in organizing the current event.

In various embodiments, the context refinement module 330 may use additional data sources to further refine the parameters for the fields of the event data object. In one such embodiment, a user may make his or her calendar available to the virtual assistant 230. The context refinement module 330 may then add negative parameters to the when field based on when the user's calendar indicates the user is not available and/or increase the preference level for times when the user's calendar indicates the user is available. The context refinement module 330 may also adjust the where field based on a user's calendar. For example, if the user's calendar indicates that the user will be in a particular city on a given day, then that city may be added to (or its preference level boosted in) the where field.

The context refinement module 330 may iteratively change the time range for an event as the message thread develops based on the content of new messages and/or changes in external data. Where a new message indicates a previously favored time range is not possible for one of the participants, the context refinement module 330 may revisit time ranges that were previously rejected as poor choices and re-recommend them. For example, if the context refinement module initially rejected time ranges on a Tuesday because several users stated "I prefer Friday," but then one of the user's states "I can't do Friday," then the context refinement module might add time ranges on Tuesday back to the when field (or increase the preference level of those time ranges). Similarly, the context refinement module 330 may periodically check the users' calendars for changes that may make certain time ranges more or less feasible for the current event being organized. This may enable the virtual assistant 230 to effectively juggle the availability of multiple users across multiple events that are being planned in parallel.

The recommendations module 340 generates recommendations for events to present to users based on event data objects. In one embodiment, the recommendations module 340 determines a specific intent from the event data object. The general intent of organizing an event was established in creating the event data object. The specific intent narrows that intent to as type of class of event, such as going to see a movie, eating at a restaurant, going for drinks, etc. The recommendations module 340 may determine the specific intent based on the parameters stored in the what field of the event data object. For example, if the what field includes "watch a movie at a movie theater," the specific intent might be to organize an event that includes watching a movie at a movie theater. The recommendations module 340 may additionally or alternatively consider the parameters stored in other fields in establishing the specific intent. For example, the recommendations module 340 may distinguish between different size events (e.g., small, medium, and large dinner events) based on the number of people included in the who field.

The recommendations module 340 selects a recommendation agent (e.g., from a set of agents stored in the agents store 380) to service the intent. An agent in this context is computer-executable code that maps the parameters stored in the fields of the event data object to one or more recommendations. The agent may also include code to retrieve additional information to assist in organizing the event. For example, an agent might retrieve the times of movie screenings from a third party system 130 to assist in planning an event that includes watching an movie. In one embodiment, the set of agents includes one or more specific agents that are configured to service a specific intent by organizing a specific type of event (e.g., watch a movie at a movie theater, eat at a restaurant, go to a concert, etc.). The set of agents may also include a general agent that can be used for any type of event (e.g., if no specific agent is available to service the identified specific intent). In other words, the recommendations module 340 may use a specific agent if one is available to service the specific intent and fall back on a general agent otherwise.

The selected agent generates recommendations based on the parameters in the fields in the event data object. In one embodiment, the agent defines the level of specificity required for the event in each field. The level of specificity is the granularity that will be specified for that field in the event recommendation. For example, an agent for planning a meal at a restaurant might limit the event to having two to eight people (with larger gatherings having a separate agent for "large meal events"), have no specific requirement beyond eating in a restaurant for the what field (although limitations on cuisine, etc., could be specified), require that a specific restaurant is identified, and specify that a time to the nearest half hour is selected.

The agent identifies combinations of parameters consistent with those specified in the fields of the event data object. Where the parameter specified in a field is less specific (broader) than the level specified for the event (e.g., the agent requires a specific restaurant is identified and the where field specifies San Francisco), the agent may consider all of the more specific options it has information about that fall within the broader parameter specified in the field (e.g., in the previous example, the agent might consider all restaurants in San Francisco it has information about). In one embodiment, agent identifies the possible options by querying a knowledge graph (e.g., stored in the knowledge store 235) using one or more of the parameters stored in the event data object. For example, the agent may identify possible locations for a meal event in San Francisco by querying the knowledge graph for entities that are identified as both restaurants and "in San Francisco." Thus, the agent identifies a set of potential recommendations that are consistent with the parameters specified in the fields of the event data object. The potential recommendations specify users who will participate, one or more activities involved, one or more locations, and a time for the event. The time may be specified as a start time or a time range (e.g., a start time and an end time).

The agent assigns match scores to the potential recommendations in the set. A match score indicates the likelihood that the corresponding recommendation will satisfy the user's intent and will be selected. Match scores may be assigned to each potential recommendation or the set may first be filtered to remove those that are unlikely to be of value to the users. For example, the agent may filter out potential recommendations that involve an activity or location that one or more of the users identified as attending the event has previously indicated he or she dislikes (e.g., by submitting a poor review that is available in the content store 210). Where a specific agent is being used, the agent may use information retrieved from other sources to filter potential recommendations that are not viable. For example, if the event is to see a particular movie, the agent may filter out any potential recommendations at times for which there are no movie theaters within a specified radius (e.g., twenty miles) showing the movie. As other examples, the agent may filter out events at times when one of the user's calendars indicates that user is not available, potential recommendations for a meal at a restaurant that will be closed at the time in question, potential recommendations for locations that current user location data indicates at least one user will not be able to reach by the specified time, and the like.

In one embodiment, the agent calculates the match score for a potential recommendation by applying a recommendation scoring model that takes one or more signals as input. The model may have been trained using machine-learning techniques to assign high match scores to potential recommendations to which a human ranker is likely to assign a high score (e.g., based on a set of labelled training data produced by human operators). Additionally or alternatively, the model can initially be trained using existing data about events (e.g., retrieved from content store 210) and the training updated based on feedback received for events organized using the virtual assistant 230. For example, an event may be scored based on explicit feedback (e.g., ratings or "likes" of the event provided by the participants) and/or implicit feedback (e.g, how many people actually attend the event). Thus, positive and negative examples of events may be identified.

However the training data is generated, the signals used by the model may include: the day/time that users generally perform the activity and/or visit the location relative to the day/time of the potential recommendation, the day/time at which the users specified in the who field typically perform the activity and/or visit the location relative to the day/time of the potential recommendation, affinities of the users specified in the who field for the activity and/or location, affinities of other users connected with the users specified in the who field (e.g., the users' friends in the social networking system 140) for the activity and/or location, affinities of the users specified in the who field for similar activities and/or locations (e.g., if the activity is watching a particular sci-fi movie, the agent may consider the users' affinities with other movies that the knowledge store 235 indicates are sci-fi movies), and the like. A match score may be adjusted to penalize a recommendation that is inconsistent with a specified parameter. For example, the score for a recommendation that would otherwise be highly scored but is for a time at which one of the intended participants is unavailable may be adjusted downwards. Thus, the recommendation may still be presented, giving the users to proceed without that participant (or giving that participant an opportunity to change plans) but recommendations for times at which all intended participants are available will be favored. Regardless of the specific signals used, the recommendation scoring module outputs a score indicating the likelihood that the users will find value in the recommendation.

In embodiments where the parameters in the fields have preference levels, the match scores may additionally or alternatively be based on the preference levels. In one such embodiment, an overall preference level of a potential recommendation is determined by summing the preference levels of the individual parameters. The match score for the potential recommendation is calculated by combining the overall preference level with the output from the recommendation scoring model. The combination may be weighted or unweighted. In addition, in embodiments where a specific agent is being used, the match scores may be further based on information retrieved by the specific agent (e.g., from a third party service 130). The retrieved information may indicate general user opinion of a location or activity, pricing information, likely wait times, and the like. Thus, potential recommendations that are more likely to yield a positive experience may be favored. For example, restaurants, venues, and other locations with high ratings on a review website may have their match scores boosted relative to those with lower ratings.

Regardless of the specific manner in which the match scores for the potential recommendations are calculated, the recommendation module 340 generates a ranked list of potential recommendations. Each potential recommendation in the list is associated with a match score that determines its ranking in the list. In one embodiment, the recommendation module 340 determines whether the recommendations are sufficient to surface to the users based on the ranked list. This determination may be based on one or more criteria, including whether the total number of potential recommendations is less than a maximum recommendations threshold (e.g., no more than five potential recommendations) and/or whether the match score for at least one recommendation exceeds a minimum score threshold. If the recommendation module 340 determines to not surface any recommendations, the context refinement module 330 continues to obtain messages related to the initial message (e.g., by waiting for additional messages to be added to the thread by the users). The context refinement module 320 then updates the parameters in the fields of the event data object based on any additional messages obtained and the recommendation module 330 generates a new ranked list of recommendations and redetermines whether any potential recommendations should be surfaced. In one embodiment, this process is repeated after every new message is added to the thread until the recommendation module 340 determines that one or more potential recommendations should be surfaced as recommendations.

The event selection module 350 provides one or more recommendations that the recommendation module 340 determines should be surface to be presented to the users at client devices 110. In one embodiment, the event selection module 350 provides a set of recommendations (e.g., the five most highly ranked recommendations) to the users' client devices 110 where they are presented to the users. Where a specific agent is used, the recommendations may be presented with additional information, such as restaurant menus, customer reviews, photographs of the location, a weather forecast for the location at the time of the recommended event, and the like.

The users may select one of the recommendations by voting for their preferred recommendation (e.g., by selecting a representation of the recommendation on a screen of the client device 110). The event selection module 350 may require unanimous agreement among the users about a preferred recommendation. Alternatively, a majority or plurality vote may be sufficient. The event selection module 350 may provide further rounds of voting until a selection criteria is met (e.g., one recommendation receives unanimous support, one recommendation is voted for by more than half of the users, etc.).

In an alternate embodiment, the event selection module 350 does not wait until the recommendation module 340 determines that one or more potential recommendations should be surfaced. Instead, a set of recommendations (e.g., the five highest ranked recommendations) are displayed to users (e.g., in a dedicated part of the user interface within a messenger application) as soon as (or shortly after) the intent determination module 320 determines a message corresponds to intent to organize an event. As the users continue to converse in the thread, the set of recommendations being presented is updated as the rakings of the recommendations change. The users may also be able to provide explicit feedback on recommendations, such as rejecting the parameter selected for one of the fields (e.g., rejecting the specific time proposed in one of the recommendations). This feedback may then be fed back into the recommendations module 340 to update the rankings. In some embodiments, the users may be able to "lock" one or more of the fields in a recommendation while allowing the others to remain changeable as the ranking are updated. For example, a user might indicate that the what field should be locked (e.g., that the event should definitely include watching a particular movie) but allow the process to continue to further narrow down the options for the where, when, and who fields.

Once a recommendation is selected, the event selection module 350 notifies the users that the recommendation is being implemented as an event. In one embodiment, the event selection module 350 adds a message to the thread confirming the details of the event. Alternatively or additionally, the users may be notified by other channels, such as via email, SMS message, or the like. In some embodiments, the event selection module 350 may add the event to the users' calendars.

The agent creation module 360 provides an interface with which new specific agents may be created. In one embodiment, a user (e.g., a system administrator) selects an intent that the agent is intended to serve (e.g., from an existing ontology of predefined intents) and defines what additional information the agent should retrieve (e.g., movie listings, venue opening times, restaurant menus, etc.) and how that information should be used. The user may also specify how the additional information should be applied to adjust match scores and/or what information should be presented when recommendations are surfaced, as well as how it should be presented. In some embodiments, the user may also specify criteria for when recommendations should be presented to the users. Thus, creating a new agent can provide a customized user experience in serving a particular user intent. Furthermore, in some embodiments, there may be multiple agents that can service a single intent. Which agent is used in a given instance of that intent may be determined from user input (e.g., the user selects a preferred agent) or in an automated manner (e.g., a random agent may be selected).

In one embodiment, the agent creation module 360 analyzes instances of a general agent being used to service an intent and analyzes the corresponding messages thread to determine a specific intent. The agent creation module 360 may calculate metrics indicating how often different specific intents were serviced by the general agent. These metrics may include total number of instances of the specific intent being served by the general agent, a frequency of the specific intent being served by the general agent, a percentage of total recommendations made that included the specific intent being serviced by the general agent, or the like. In other words, the metrics indicate demand for specific agents that are not currently available. If the demand exceeds a predetermined value (e.g., the value of a metric exceeds a demand threshold), the agent creation module 360 may generate a notification (e.g., sent to an agent designer) suggesting that a new specific agent be created. Alternatively or additionally, the agent creation module 260 may provide a user interface, such as a dashboard, presenting the metrics such that a user (e.g., an agent designer) can identify specific intents that are good candidates for the creation of a new specific agent.

The message threads store 370 includes one or more computer-readable media configured to store messages and the metadata indicating the corresponding threads. In one embodiment, the messages are indexed by thread ID such that the context refinement module 330 may efficiently retrieve related messages with a query. The messages may also be indexed by other data, such as user ID of the participants in the corresponding thread. Similarly, the agent store 380 includes one or more computer-readable media configured to store the agents used by the recommendation module 340. The agents may be indexed by the intents that they service. Although they are shown as distinct entities, in some embodiments, the message threads store 370 and the agent store 380 may be a single computer-readable medium. In other embodiments, the message threads store 370 and/or the agent store 380 may be distributed across multiple computer-readable media located at multiple computing devices. For example, the message threads store 370 might be a distributed database.

Example Computing System Architecture

Figure 4:
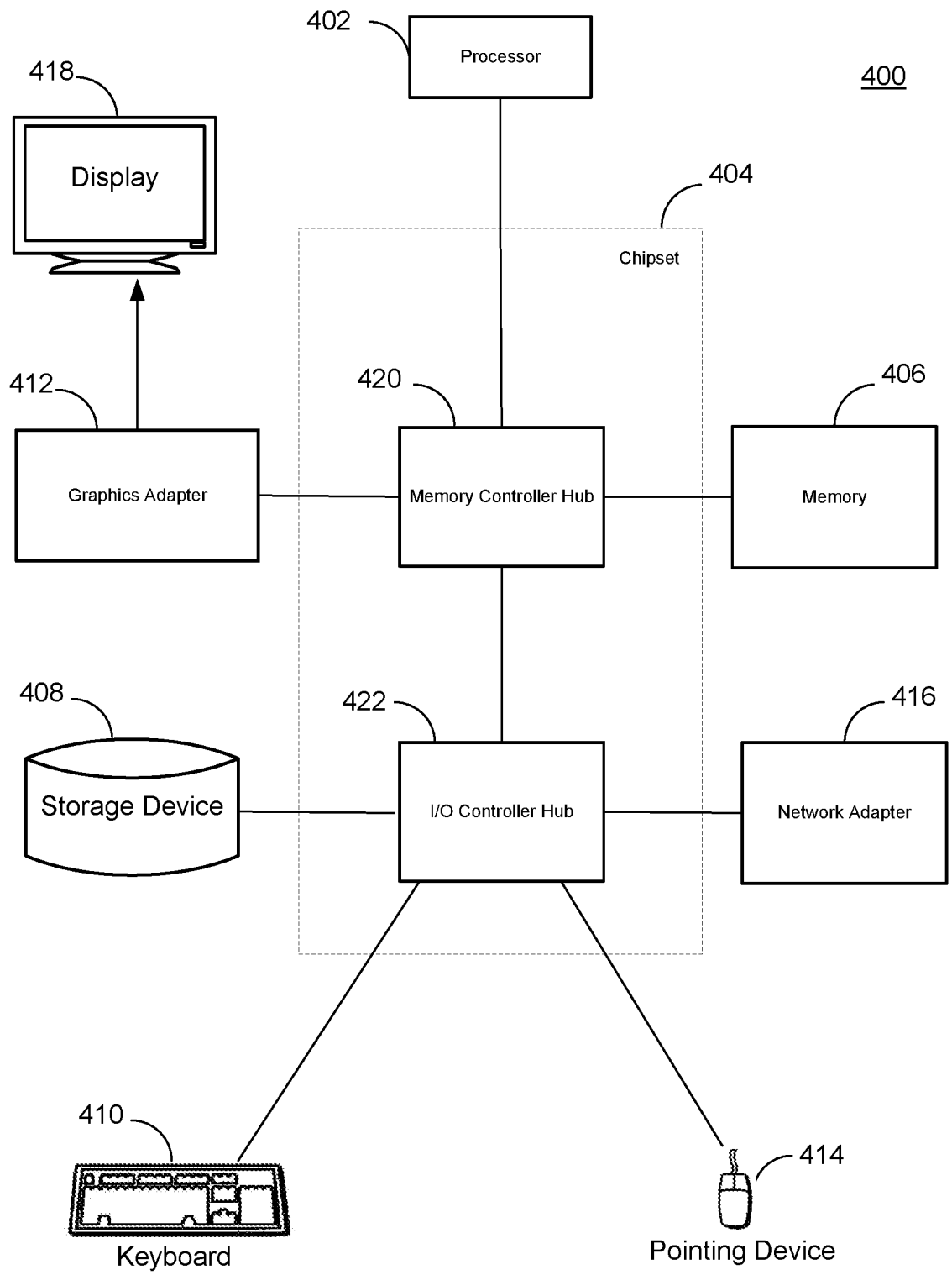
FIG. 4 illustrates a computer suitable for use in the system environment of FIG. 1, according to one embodiment.

FIG. 4 is a high-level block diagram illustrating an example computer 400 suitable for use as a client device 1 10, third party system 130, or server in the online system 140. The example computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, pointing device 414, and network adapter 416 are coupled to the I/O controller hub 422. Other embodiments of the computer 400 have different architectures.

In the embodiment shown in FIG. 4, the storage device 408 is a non-transitory computer-readable storage medium such as a hard drive, compact disk read-only memory (CD-ROM), DVD, or a solid-state memory device. The memory 406 holds instructions and data used by the processor 402. The pointing device 414 is a mouse, track ball, touch-screen, or other type of pointing device, and is used in combination with the keyboard 410 (which may be an on-screen keyboard) to input data into the computer system 400. The graphics adapter 412 displays images and other information on the display 418. The network adapter 416 couples the computer system 400 to one or more computer networks.

The types of computers used by the entities of FIGS. 1 through 3 can vary depending upon the embodiment and the processing power required by the entity. For example, the online system 140 might include a distributed database system comprising multiple blade servers working together to provide the functionality described. Furthermore, the computers can lack some of the components described above, such as keyboards 410, graphics adapters 412, and displays 418.

Example Methods for Providing Event Recommendations

Figure 5:
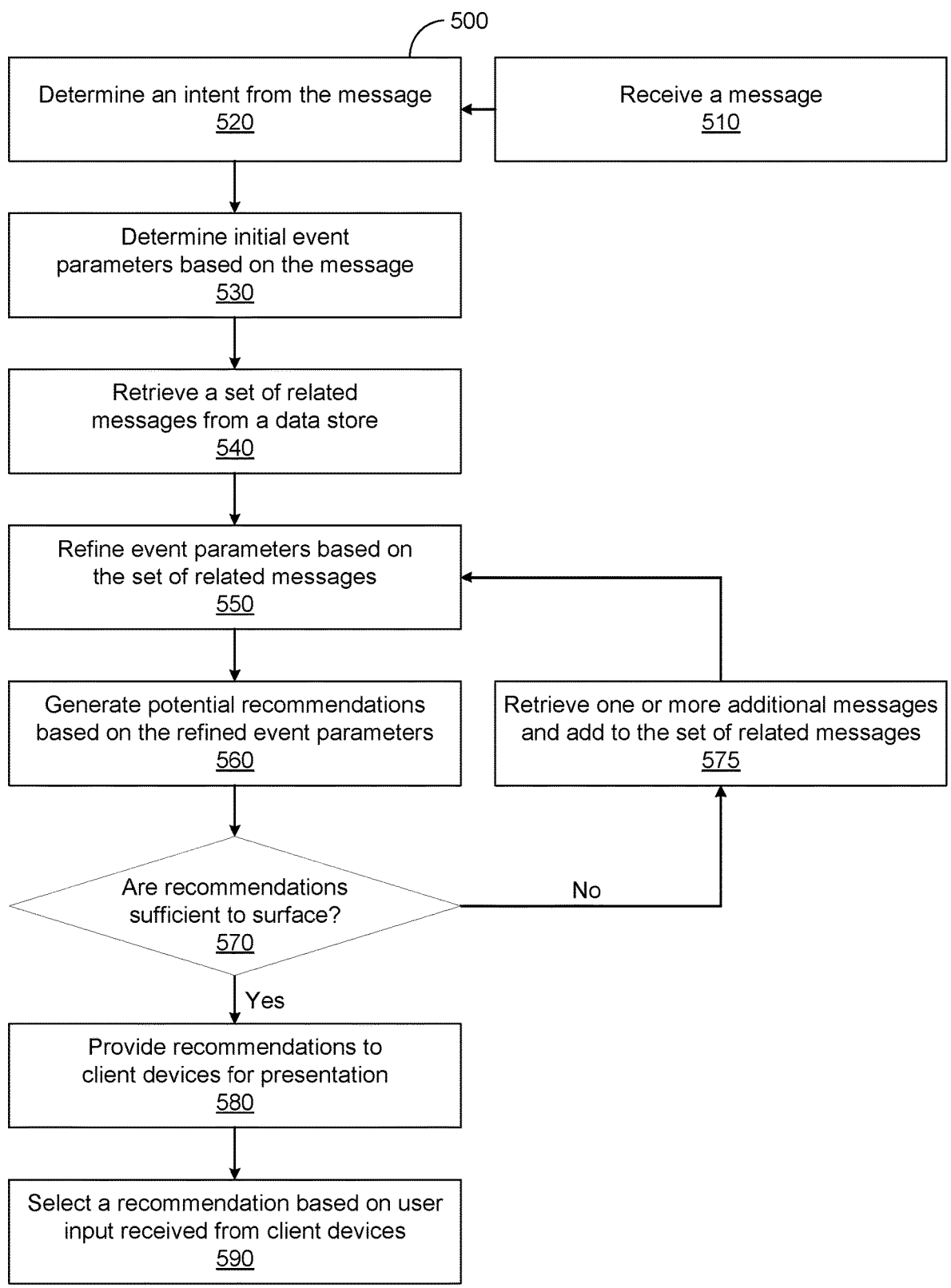
FIG. 5 is a flow chart illustrating a method for coordinating an event using a virtual assistant, in accordance with an embodiment.

FIG. 5 illustrates one embodiment of a method 500 for coordinating an event. The steps of FIG. 5 are illustrated from the perspective of the virtual assistant 230 performing the method 500. However, some or all of the steps may be performed by other entities and/or components. In addition, some embodiments may perform the steps in parallel, perform the steps in different orders, or perform different steps.

In the embodiment shown in FIG. 5, the method 500 begins with the virtual assistant 230 receiving 510 a message from a client device 110 of a user. The message includes content created by the user and metadata. The metadata includes an indication of a thread of which the message is a part (or an indication that the message is the start of a new thread). The thread is a conversation between a set of users who are sending and/or receiving messages from each other via their client devices 110.

The virtual assistant 230 determines 520 an intent for the message. In one embodiment, the virtual assistant 230 selects the intent from a predetermined ontology that defines each intent. The virtual assistant 230 analyzes the content of the message and determines which intent in the ontology best matches the message. In other embodiments, other approaches to determining message intent may be used. As described previously, if the determined intent is to organize an event, the virtual assistant 230 creates an event data object and associates it with the thread of which the message is a part (assuming there is not already an appropriate event data object associated with the thread). The message is thus an initial message, as defined above with reference to the intent determination module 320 of FIG. 3.

Referring back to FIG. 5, the virtual assistant 230 determines 530 initial parameters for the event based on the content of the initial message. In one embodiment, the virtual assistant 230 analyzes the content of the message to identify references to users (who), activities (what), locations (where), and times (when) to populate the fields of an event data object. The who filed may additionally or alternatively be populated with the user who sent the initial message and users who received the initial message. The initial parameters may be associated with preference levels indicating the desirability of selecting the corresponding parameters for the event. In some embodiments, the virtual assistant 230 supplements the initial parameters based on additional data (e.g., from the user profile store 205, content store 210, and/or edges store 225) indicating suggested parameters for the event in which the users are likely to find value. For example, if the initial message indicates the sending user wants to arrange to go and see a sci-fi movie and one of the user's contacts in the social networking system 140 has a high affinity for sci-fi movies, that contact might be added to the initial parameters as a possible attendee. As another example, the home towns of users in the who field may be used to populate the where field (e.g., if both users live in the same town, that town may be included in the where field automatically). As yet another example, if the initial message identifies a location and participants for an event but not an activity or time, the participant's interests and schedule (e.g., as indicated by "likes" and calendars in the user profile store 205, respectively) may be used to provide suggestions for the what and when fields.

The virtual assistant 230 retrieves 540 a set of messages that are related to the initial message from a data store (e.g., the message threads store 370). As described previously, in one embodiment, the set of messages are messages in the same thread as the initial message. Additionally or alternatively, the set of messages may include other messages exchanged by the users (or a subset of the users).

The virtual assistant 230 refines 550 the event parameters based on the set of related messages. In one embodiment, the virtual assistant 230 analyzes the related messages to identify parameters to include or exclude, as described above with reference to the context refinement module 330 of FIG. 3. In embodiments where the parameters have associated preference levels, the virtual assistant 230 may adjust the preference level of one or more parameters based on the set of messages. For example, the preference level of a parameter may be increased for each related message that refers to it positively (e.g., "I like sci-fi movies," "8 pm works for me," etc.) while the preference level of a parameter may be reduced for each related message that refers to it negatively (e.g., "I'd prefer a comedy," "7 pm doesn't work for me," etc.).

The virtual assistant 230 generates 560 a set of potential recommendations based on the refined event parameters. In one embodiment, the potential recommendations are combinations of people (who), activities (what), locations (where), and times (when) that are consistent with the event parameters and meet the specificity requirements of the selected agent, as described above with reference to the recommendations module of FIG. 3. The virtual assistant 230 calculates a match score for each potential recommendation, as described above with reference to the recommendations module 340. Embodiments of a method for generating 560 potential recommendations are described in greater detail below, with reference to FIG. 6.

Based on the match scores, the virtual assistant 230 determines 570 whether there are any recommendations sufficient to surface. The virtual assistant 230 may determine 570 that recommendations should be surfaced if the total number of potential recommendations is below a specified amount (e.g., five), if the match score for at least one potential recommendation exceeds a minimum score threshold, or the like. Alternatively, the virtual assistant 230 may always present recommendations regardless of the total number of potential recommendations and their match scores.

If the virtual assistant 230 determines 570 that the recommendations are not sufficient to surface, the virtual assistant retrieves 575 one or more additional messages and adds them to the set of related messages. In one embodiment, retrieving 575 additional messages includes waiting for an additional message to be added to the message thread that includes the initial message. After retrieving 575 the additional messages, the virtual assistant repeats the steps of refining 550 the event parameters and generating 560 potential recommendations, and then redetermines 570 whether the recommendations are sufficient to surface. These steps may loop until either the virtual assistant 230 determines 570 to surface recommendations or a break condition is met, such as the intent determination module 320 identifying a new intent (e.g., that the users are now discussing a different potential event, and a new event data object should be created).

Assuming that the virtual assistant 230 determines 570 that there are recommendations sufficient to surface, one or more recommendations are provided 580 to the users' client devices 110 for presentation. In one embodiment, the virtual assistant 230 provides 580 a specified number (e.g., five) of the most highly ranked recommendations (as indicated by the match scores). In another embodiment, the virtual assistant 230 provides 580 any recommendation for which the match score exceeds a minimum match score threshold. In other embodiments, the virtual assistant 230 may determine which recommendations and/or how many recommendations to provide 580 in other ways.

The virtual assistant 230 selects 590 one of the recommendations based on user input received from the client devices 110. In one embodiment, the recommendations are displayed to the users on their client devices 110 and the users vote for their preference. The user votes are sent to the virtual assistant 230, which selects 590 a recommendation based on the received votes (e.g., the recommendation with the most votes, a recommendation with at least half of the votes, a recommendation that was unanimously selected, etc.). The virtual assistant 230 notifies the users of which recommendation was selected 590 (e.g., with a message displayed in the application in which the users voted, via SMS message, via email, or the like). In some embodiments, an entry may be added to the users' calendars for the event.

Figure 6:
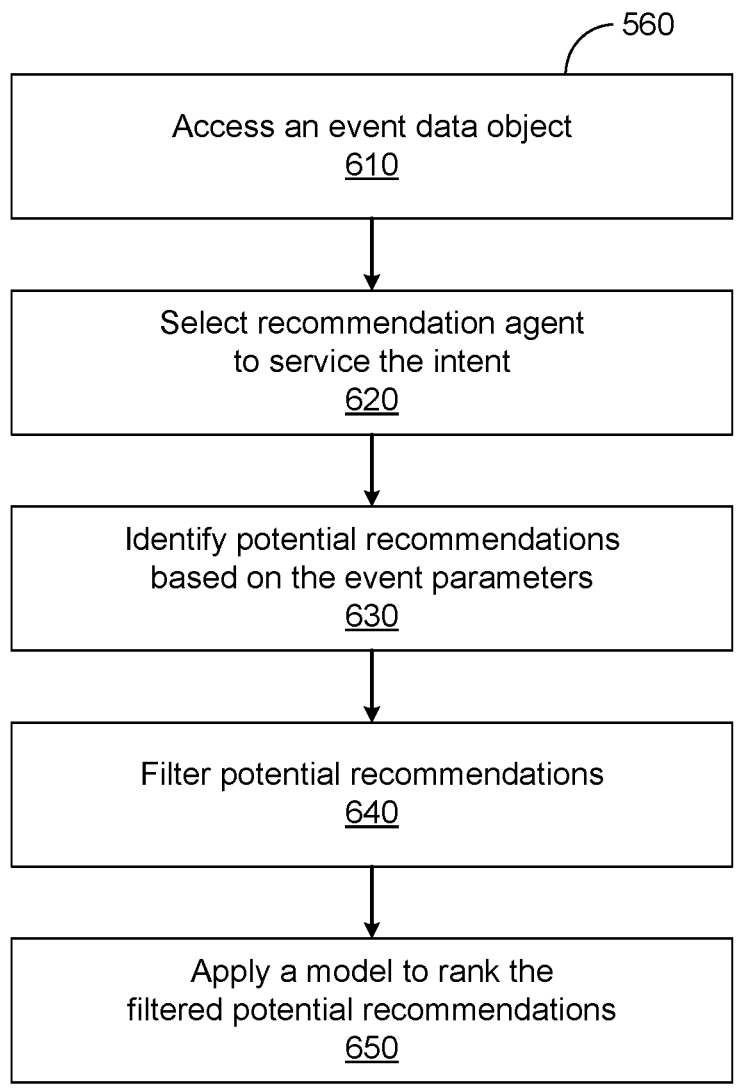
FIG. 6 is a flow chart illustrating a method for generating recommendations for an event using a virtual assistant, in accordance with an embodiment.

FIG. 6 illustrates one embodiment of a method 560 for generating recommendations for an event. The steps of FIG. 6 are illustrated from the perspective of the recommendation module 340 performing the method 560. However, some or all of the steps may be performed by other entities and/or components. In addition, some embodiments may perform the steps in parallel, perform the steps in different orders, or perform different steps.

In the embodiment shown in FIG. 6, the method 560 begins by accessing 610 an event data object. Based on the event parameters stored in the fields of the event data object, the recommendation module 340 can determine a specific intent, as described above with reference to FIG. 3. The recommendation module 340 selects 620 a recommendation agent to service the intent. In one embodiment, the recommendation module 340 determines whether there is a specific agent for servicing the request (e.g., by querying the agent store 380). If there is a specific agent, the recommendation module 340 selects that specific agent. Otherwise, a general agent is selected. If there is more than one specific agent that may service the intent, the recommendation module 340 may select between them in any appropriate manner (e.g., based on user preference, random selection, or the like).

The recommendation module 340 executes the agent to identify 630 potential recommendations based on the event parameters stored in the event data object. In one embodiment, the potential recommendations are combinations of people (who), activities (what), locations (where), and times (when) that are consistent with the event parameters and meet the specificity requirements of the selected agent. In embodiments where the event parameters have preference levels, the potential recommendations may include combinations based on any event parameters for which the corresponding preference levels exceed a predetermined value.

In one embodiment, the recommendation module 340 determines whether the parameters specialized in the fields of the event data object are specific enough to meet the agent's requirements. Where the selected agent determines a parameter in a field is specific enough, the agent may include it in a recommendation. In contrast, if a parameter is not specific enough (e.g., the parameter specifies a city and the agent is configured to organize a meal at a restaurant), the virtual assistant 230 queries a knowledge base (e.g., stored in the knowledge store 235) for specific parameter values that are consistent with the requirements of the agent. For example, where the location field identifies a city, the virtual assistant might query the knowledge base for venues in the city that are suitable for an activity included in the what field. Thus, the virtual assistant generates 560 a set of potential recommendations with specific values assigned for who, that, where, and when.

The recommendation module 340 filters 640 the potential recommendations based on likelihood that they will provide value to the users. In one embodiment, the recommendation module 340 retrieves information about the users (e.g., from the user profile store 205) and filters out potential recommendations that the information about the users indicates one or more of the users is unlikely to select. For example, if one of the users has previously given a negative review to a particular venue or expressed a dislike for a particular activity, potential recommendations involving that venue or activity may be filtered out. Similarly, if a first user in the who field has blocked a second user in the who field in the social networking system 140, recommendations including both users may be filtered out. This may occur where the two users were included based on a mutual connection in the social networking system 140. For example, if all of the participants identified in the who field for an event live in the same town, recommendations in other locations may be filtered out. In another embodiment, no filtering is applied to the potential recommendations.

The recommendation module 340 applies 650 a model to rank the potential recommendations. In one embodiment, the recommendation module 340 calculates a match score for each potential recommendation, as described above with reference to FIG. 3. The match scores indicate a likelihood that the corresponding recommendations will be selected by the users. The recommendation module 340 uses the match scores to create a ranked list of recommendations. The ranked list of recommendations may be used to determine whether to present recommendations to the users and/or which and how many of the recommendations to present to the users, as described previously with reference to FIG. 3 and FIG. 5.

Figure 7:
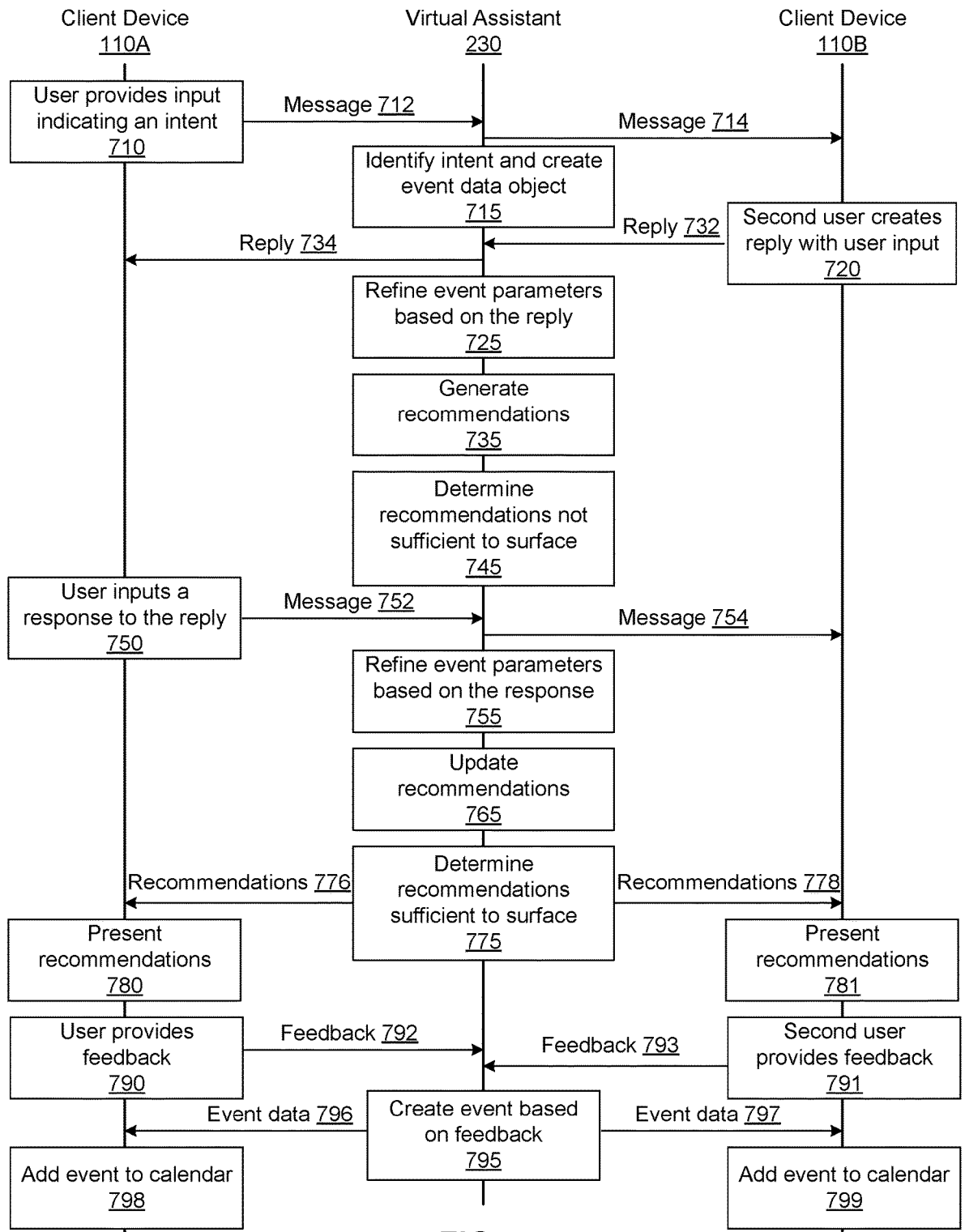
FIG. 7 is an interactions diagram illustrating the coordination of an event using a virtual assistant, according to an embodiment.

FIG. 7 is an interactions diagram illustrating the coordination of an event, according to one embodiment. In FIG. 7, various actions are illustrated as being performed by various entities and/or components. However, some or all of the actions may be performed by other entities and/or components. In addition, some embodiments may perform the actions in parallel, perform the actions in different orders, or perform different actions. FIG. 7 illustrates an example where two users are organizing an event with the assistance of a virtual assistant 230 for illustrative purposes. However, the disclosed methods may be used to organize events with other numbers of users. Similarly, although FIG. 7 only shows the exchange of three messages, many more messages may be exchanged between users.

The embodiment shown in FIG. 7 begins with a first user providing 710 user input at a first client device 110A. The user input creates a message to a second user that includes message content indicating an intent of the first user to organize an event with the second user. The message is sent 712 to the virtual assistant 230 which forwards 714 it to a second client device 110B associated with the second user. The virtual assistant 230 analyzes the message to identify 715 the first user's intent to organize an event. On identifying 715 the intent, the virtual assistant 230 creates an event data object. The virtual assistant 230 may populate one or more of the fields of the event data object based on the content of the message.

The second user creates 720 a reply to the message with user input at the second client device 110B. The second client device 110B sends 732 the reply to the virtual assistant 230 which forwards 724 it to the first client device 110A. The virtual assistant 230 refines 725 the event parameters based on the reply. Refining 725 the event parameters may include adding new parameters to one or more fields, removing parameters from one or more fields, and/or narrowing the scope of parameters in one or more fields. Refining 725 the event parameters may also include adjusting preference levels associated with parameters in embodiments where preference levels are used.

The virtual assistant 230 generates 735 a set of recommendation based on the event parameters. At this time, in the example show, the virtual assistant 230 determines 745 that the recommendations are not sufficient to surface. The first user inputs 750 a response to the reply received from the second user at the first client device 110A. The first client device 110A sends 752 the response to the virtual assistant 230 which forwards 754 it to the second client device 754.

The virtual assistant 230 further refines 755 the event parameters based on the response and updates 765 the recommendations based on the further refined event parameters. At this point, in the example shown, the virtual assistant 230 determines 775 that the recommendations are sufficient to surface. The virtual assistant 230 sends 776 one or more recommendations to the first client device 110A for presentation 780 to the first user. The one or more recommendations are also sent 778 to the second client device 110B for presentation 781 to the second user.

The first user provides 790 feedback on the recommendations using the first client device 110A (e.g., by voting for a preferred recommendation) and the feedback is sent 792 to the virtual assistant 230. Similarly, the second user provides 791 feedback on the recommendations at the second client device 110B and it is sent 793 to the virtual assistant 230. The virtual assistant 230 creates 795 an event based on the feedback. For example, a recommendation receiving the most positive feedback (e.g., the most user votes) may be selected and implemented. The virtual assistant 230 sends 796 event data (e.g., the values for who, what, where, and when of the selected recommendation) to the first client device 110A which adds 798 the event to the first user's calendar. The event data is also sent 797 to the second client device 110B to be added 799 to the second user's calendar. Additionally or alternatively, the event may be added 798, 799 to the users' calendars by updating the users' user profiles in the user profile store 205.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving at a first time, from a client device, a message including message content, the message in a thread of messages between one or more users;
   determining, based on the message content, an intent to organize an event;
   determining initial parameters for the event based on the message content, wherein at least one parameter of the initial parameters is associated with a preference score, the preference score indicating desirability of selecting a particular parameter for the event, the preference score being able to take at least three distinct values;
   retrieving, from a data store, a set of related messages, the related messages including previous messages that were added to the thread of messages at an earlier time than the first time, before the message was received;
   refining the initial parameters based on the previous messages to produce refined event parameters, the refining comprising adjusting the preference score of the parameter based on a reference to the parameter in the related messages;
   generating a set of potential recommendations based on the refined event parameters;
   selecting one or more of the potential recommendations to surface as recommendations; and
   providing the recommendations to the client device for presentation to a user.

2. The method of claim 1, further comprising:
   determining the potential recommendations are not sufficient to surface as recommendations;
   retrieving an additional message that is related to the message;
   further refining the refined event parameters based on the additional message to produce further refined event parameters; and
   updating the set of potential recommendations based on the further refined event parameters, wherein the potential recommendations to surface as recommendations are selected from among the updated set of potential recommendations.

3. The method of claim 1, further comprising:
   creating, responsive to the intent, an event data object, the event data object including a plurality of fields for storing the event parameters, each field corresponding to a different type of event parameter, the plurality of fields including at least one of:
   a who field configured to store identifiers of users who may participate in the event;
   a what field configured to store activities that may be included in the event;
   a where field configured to store locations at which the event may take place; and
   a when field configured to store times at which the event may occur,
   wherein the set of potential recommendations is generated based on a value stored in at least one of the plurality of fields.

4. The method of claim 3, wherein determining the initial parameters comprises:
   adding, to the who field, a user identifier of at least one of: a user that sent the message or a user that received the message;
   determining a specific intent based on the content of the message; and
   adding, to the what field, an activity based on the specific intent,
   wherein the set of potential recommendations include an event involving a user identified by the user identifier and the activity.

5. The method of claim 1, wherein generating the set of potential recommendations comprises:
   identifying potential recommendations based on the refined event parameters;

calculating match scores for at least some of the potential recommendations, each match score indicating a likelihood that a corresponding potential recommendation will service the intent,
wherein the potential recommendations to surface as recommendations are selected based on the match scores.

6. The method of claim 5, wherein the event parameters include an activity to include in the event, users who will participate in the event, and a location for the event, and wherein calculating the match scores comprises:
applying a model that takes one or more signals as input and outputs a match score, the one or more signals including at least one of:
a time that users generally perform the activity,
a time at which the users specified in the event parameters typically perform the activity,
a time that users typically visit the location;
a time that the users specified in the event parameters typically visit the location,
affinities of the users specified in the event parameters for the activity, or
affinities of the users specified in the event parameters for the location.

7. The method of claim 5, wherein
at least some of the match scores are based on the preference score of the particular parameter.

8. The method of claim 1, wherein each of the recommendations includes identifiers of a plurality of users to include in the event, the method further comprising:
receiving feedback regarding the recommendations from client devices of at least some of the plurality of users;
selecting one of the recommendations based on the feedback; and
sending information about the selected recommendation to client devices of the plurality of users identified by the identifiers includes in the selected recommendation.

9. The method of claim 1, further comprising refining the initial parameters based on user profile information of the one or more users.

10. The method of claim 1 further comprising:
identifying, from the initial parameters, an additional user in one or more of the users' contacts, the additional user predicted to find value in the event; and
responsive to identifying the additional user, recommending the additional user as a potential attendee for the event.

11. The method of claim 1, wherein the preference score is expressed as a preference level, and the three or more distinct values comprise a high level, a medium level, and a low level.

12. A non-transitory computer-readable medium storing computer program instructions executable by a processor to perform operations comprising:
receiving at a first time, from a client device, a message including message content, the message in a thread of messages between one or more users;
determining, based on the message content, an intent to organize an event;
determining initial parameters for the event based on the message content, wherein at least one parameter of the initial parameters is associated with a preference score, the preference score indicating desirability of selecting a particular parameter for the event, the preference score being able to take at least three distinct values;
retrieving, from a data store, a set of related messages, the related messages including previous messages that were added to the thread of messages at an earlier time than the first time, before the message was received;
refining the initial parameters based on the previous messages to produce refined event parameters, the refining comprising adjusting the preference score of the parameter based on a reference to the parameter in the related messages;
generating a set of potential recommendations based on the refined event parameters;
selecting one or more of the potential recommendations to surface as recommendations; and
providing the recommendations to the client device for presentation to a user.

13. The non-transitory computer-readable medium of claim 12, wherein the operations further comprise:
determining the potential recommendations are not sufficient to surface as recommendations;
retrieving an additional message that is related to the message;
further refining the refined event parameters based on the additional message to produce further refined event parameters; and
updating the set of potential recommendations based on the further refined event parameters, wherein the potential recommendations to surface as recommendations are selected from among the updated set of potential recommendations.

14. The non-transitory computer-readable medium of claim 12, wherein the operations further comprise:
creating, responsive to the intent, an event data object, the event data object including a plurality of fields for storing the event parameters, each field corresponding to a different type of event parameter, the plurality of fields including at least one of:
a who field configured to store identifiers of users who may participate in the event;
a what field configured to store activities that may be included in the event;
a where field configured to store locations at which the event may take place; and
a when field configured to store times at which the event may occur,
wherein the set of potential recommendations is generated based on a value stored in at least one of the plurality of fields.

15. The non-transitory computer-readable medium of claim 14, wherein determining the initial parameters comprises:
adding, to the who field, a user identifier of at least one of: a user that sent the message or a user that received the message;
determining a specific intent based on the content of the message; and
adding, to the what field, an activity based on the specific intent,
wherein the set of potential recommendations include an event involving a user identified by the user identifier and the activity.

16. The non-transitory computer-readable medium of claim 12, wherein generating the set of potential recommendations comprises:
identifying potential recommendations based on the refined event parameters;
calculating match scores for at least some of the potential recommendations, each match score indicating a likelihood that a corresponding potential recommendation will service the intent, wherein the potential recommendations to surface as recommendations are selected based on the match scores.

17. The non-transitory computer-readable medium of claim 16, wherein the event parameters include an activity to include in the event, users who will participate in the event, and a location for the event, and wherein calculating the match scores comprises:
applying a model that takes one or more signals as input and outputs a match score, the one or more signals including at least one of:
a time that users generally perform the activity,
a time at which the users specified in the event parameters typically perform the activity,
a time that users typically visit the location;
a time that the users specified in the event parameters typically visit the location,
affinities of the users specified in the event parameters for the activity, or
affinities of the users specified in the event parameters for the location.

18. The non-transitory computer-readable medium of claim 16, wherein
at least some of the match scores are based on the preference score of the particular parameter.

19. The non-transitory computer-readable medium of claim 12, wherein each of the recommendations includes identifiers of a plurality of users to include in the event, and the operations further comprise:
receiving feedback regarding the recommendations from client devices of at least some of the plurality of users;
selecting one of the recommendations based on the feedback; and
sending information about the selected recommendation to client devices of the plurality of users identified by the identifiers includes in the selected recommendation.

20. A computer system comprising:
one or more processors; and
one or more computer readable media storing computer program instructions that, when executed, cause the one or more processors to perform operations including:
receiving at a first time, from a client device, a message including message content, the message in a thread of messages between one or more users;
determining, based on the message content, an intent to organize an event;
determining initial parameters for the event based on the message content, wherein at least one parameter of the initial parameters is associated with a preference score, the preference score indicating desirability of selecting a particular parameter for the event, the preference score being able to take at least three distinct values;
retrieving, from a data store, a set of related messages, the related messages including previous messages that were added to the thread of messages at an earlier time than the first time, before the message was received;
refining the initial parameters based on the previous messages to produce refined event parameters, the refining comprising adjusting the preference score of the parameter based on a reference to the parameter in the related messages;
generating a set of potential recommendations based on the refined event parameters;
selecting one or more of the potential recommendations to surface as recommendations; and
providing the recommendations to the client device for presentation to a user.

21. The computer system of claim 20, wherein the operations further include:
determining the potential recommendations are not sufficient to surface as recommendations;
retrieving an additional message that is related to the message;
further refining the refined event parameters based on the additional message to produce further refined event parameters; and
updating the set of potential recommendations based on the further refined event parameters, wherein the potential recommendations to surface as recommendations are selected from among the updated set of potential recommendations.

22. The computer system of claim 20, wherein generating the set of potential recommendations comprises:
identifying potential recommendations based on the refined event parameters;
calculating match scores for at least some of the potential recommendations, each match score indicating a likelihood that a corresponding potential recommendation will service the intent,
wherein the potential recommendations to surface as recommendations are selected based on the match scores.

23. The computer system of claim 22, wherein the event parameters include an activity to include in the event, users who will participate in the event, and a location for the event, and wherein calculating the match scores comprises:
applying a model that takes one or more signals as input and outputs a match score, the one or more signals including at least of:
a time that users generally perform the activity,
a time at which the users specified in the event parameters typically perform the activity,
a time that users typically visit the location;
a time that the users specified in the event parameters typically visit the location,
affinities of the users specified in the event parameters for the activity, or affinities of the users specified in the event parameters for the location.

* * * * *